(12) United States Patent
McMillan

(10) Patent No.: US 12,252,245 B2
(45) Date of Patent: Mar. 18, 2025

(54) BEADED COMPOSITE STRUCTURES AND METHODS FOR MANUFACTURING BEADED COMPOSITE STRUCTURES

(71) Applicant: The Boeing Company, Chicago, IL (US)

(72) Inventor: Daniel J. McMillan, Edmonds, WA (US)

(73) Assignee: The Boeing Company, Arlington, VA (US)

( * ) Notice: Subject to any disclaimer, the term of this patent is extended or adjusted under 35 U.S.C. 154(b) by 7 days.

(21) Appl. No.: 17/545,056

(22) Filed: Dec. 8, 2021

(65) Prior Publication Data

US 2022/0227475 A1 Jul. 21, 2022

Related U.S. Application Data

(60) Provisional application No. 63/139,509, filed on Jan. 20, 2021.

(51) Int. Cl.
*B32B 3/28* (2006.01)
*B29C 70/30* (2006.01)
(Continued)

(52) U.S. Cl.
CPC ............... *B64C 3/20* (2013.01); *B29C 70/30* (2013.01); *B64C 3/26* (2013.01); *B29L 2031/3085* (2013.01)

(58) Field of Classification Search
CPC .... B64C 3/20; B64C 3/26; B32B 3/28; B32B 3/00; B32B 2603/00; B32B 2605/18
See application file for complete search history.

(56) References Cited

U.S. PATENT DOCUMENTS 3,029,910 A   4/1962 Kirk et al.
4,804,571 A * 2/1989 Jouffreau ............... F16L 59/12
                                              244/159.1

(Continued)

FOREIGN PATENT DOCUMENTS

CA    2 414 160      6/2004
CN    101801789      8/2010
(Continued)

OTHER PUBLICATIONS

European Patent Office, Extended European Search Report, App. No. 22150422.8 (Jun. 9, 2022).

*Primary Examiner* — Joanna Pleszczynska
(74) *Attorney, Agent, or Firm* — Walters & Wasylyna LLC

(57) ABSTRACT

A composite structure has a first layer connect to a second layer to form a layered structure. The second layer has a plurality of base portions abutting the first layer and a plurality of beaded portions protruding from the plurality of base portions. Each beaded portion of the plurality of beaded portions defines a channel between the first layer and the second layer. A method for manufacturing a composite structure includes depositing composite material over a tool to form a second layer. The second layer has a plurality of beaded portions and a plurality of base portions. The method includes distributing a plurality of mandrels over the second layer to define channels in the plurality of beaded portions. The method includes depositing composite material over the second layer and the plurality of mandrels to form a first layer. The method includes bonding the first layer to the second layer.

20 Claims, 11 Drawing Sheets

(51) Int. Cl.
*B32B 3/00* (2006.01)
*B64C 3/20* (2006.01)
*B64C 3/26* (2006.01)
*B29L 31/30* (2006.01)

(56) References Cited

U.S. PATENT DOCUMENTS

| | | | |
|---|---|---|---|
| 5,893,534 A | 4/1999 | Watanabe | |
| 5,996,730 A | 12/1999 | Pirchl | |
| 7,533,794 B2 | 5/2009 | Comley et al. | |
| 7,850,058 B2 | 12/2010 | Connelly et al. | |
| 8,087,614 B2 * | 1/2012 | Childs | B64C 3/182 |
| | | | 244/119 |
| 8,844,796 B1 | 9/2014 | Slattery | |
| 9,399,509 B2 * | 7/2016 | Rolfes | B64C 3/182 |
| 9,993,925 B2 * | 6/2018 | Shaw | B25J 15/0616 |
| 10,427,778 B2 | 10/2019 | Connelly et al. | |
| 10,807,699 B1 * | 10/2020 | Stuckey | B64C 1/061 |
| 2003/0201366 A1 | 10/2003 | Connelly et al. | |
| 2005/0230552 A1 | 10/2005 | Engwall et al. | |
| 2006/0038064 A1 | 2/2006 | Mandet et al. | |
| 2007/0102494 A1 | 5/2007 | Connelly et al. | |
| 2008/0302912 A1 * | 12/2008 | Yip | B29C 70/446 |
| | | | 244/119 |
| 2009/0029139 A1 | 1/2009 | Schweiggart et al. | |
| 2009/0098321 A1 | 4/2009 | Zielinski et al. | |
| 2009/0188747 A1 | 7/2009 | Smatloch et al. | |
| 2012/0043422 A1 * | 2/2012 | Campana | B64C 1/26 |
| | | | 244/123.1 |
| 2013/0099063 A1 * | 4/2013 | Grip | B64C 3/22 |
| | | | 156/60 |
| 2013/0174572 A1 | 7/2013 | Raison et al. | |
| 2013/0266769 A1 | 10/2013 | Connelly | |
| 2016/0001888 A1 | 1/2016 | Shephard et al. | |
| 2016/0129985 A1 * | 5/2016 | Mohanty | B64C 3/182 |
| | | | 244/119 |
| 2019/0283856 A1 * | 9/2019 | Clapp | B32B 7/12 |

FOREIGN PATENT DOCUMENTS

| | | |
|---|---|---|
| CN | 103057709 | 4/2013 |
| CN | 105026264 | 11/2015 |
| DE | 198 49 366 | 4/2000 |
| EP | 2 676 787 | 12/2013 |
| EP | 3 235 629 | 10/2017 |
| JP | 2009-515702 | 4/2009 |
| JP | 2010-527836 | 8/2010 |
| WO | WO 2007/058906 | 5/2007 |
| WO | WO 2009/023346 | 2/2009 |
| WO | WO 2011/061513 | 5/2011 |
| WO | WO 2014/135948 | 9/2014 |

* cited by examiner

BEADED COMPOSITE STRUCTURES AND METHODS FOR MANUFACTURING BEADED COMPOSITE STRUCTURES

PRIORITY

This application claims priority from U.S. Ser. No. 63/139,509 filed on Jan. 20, 2021.

FIELD

This application relates to composite structures and, more particularly, to composite structures and methods for manufacturing composite structures.

BACKGROUND

Typical architectural designs for airplane wing components require separate blade stringer and vent stringer fabrication prior to bonding or co-cure. Separate manufacturing steps are costly and time-consuming. Additionally, typical architecture designs for airplane wings require the use of many parts that add weight to the overall structure. Further, the space between the upper and lower portions of airplane wings is typically confined and difficult to navigate during initial assembly and subsequent maintenance. Access to that space is limited once the airplane wing has been assembled.

Accordingly, those skilled in the art continue with research and development efforts in the field of manufacturing composite structures.

SUMMARY

Disclosed are beaded composite structures.

In one or more examples, the disclosed composite structure includes a first layer and a second layer connected to the first layer to form a layered structure. The second layer has a plurality of base portions abutting the first layer and a plurality of beaded portions protruding from the plurality of base portions. Each beaded portion of the plurality of beaded portions defines a channel between the first layer and the second layer.

Also disclosed are methods for manufacturing beaded composite structures.

In one or more examples, the disclosed method for manufacturing composite structures includes depositing composite material over a tool to form a second layer. The second layer has a plurality of beaded portions and a plurality of base portions. The method further includes distributing a plurality of mandrels over the second layer to define channels in the plurality of beaded portions. The method further includes depositing composite material over the second layer and the plurality of mandrels to form a first layer. The method further includes bonding the first layer to the second layer.

Other examples of the disclosed beaded composite structures and methods for manufacturing beaded composite structures will become apparent from the following detailed description, the accompanying drawings and the appended claims.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Figure 1:
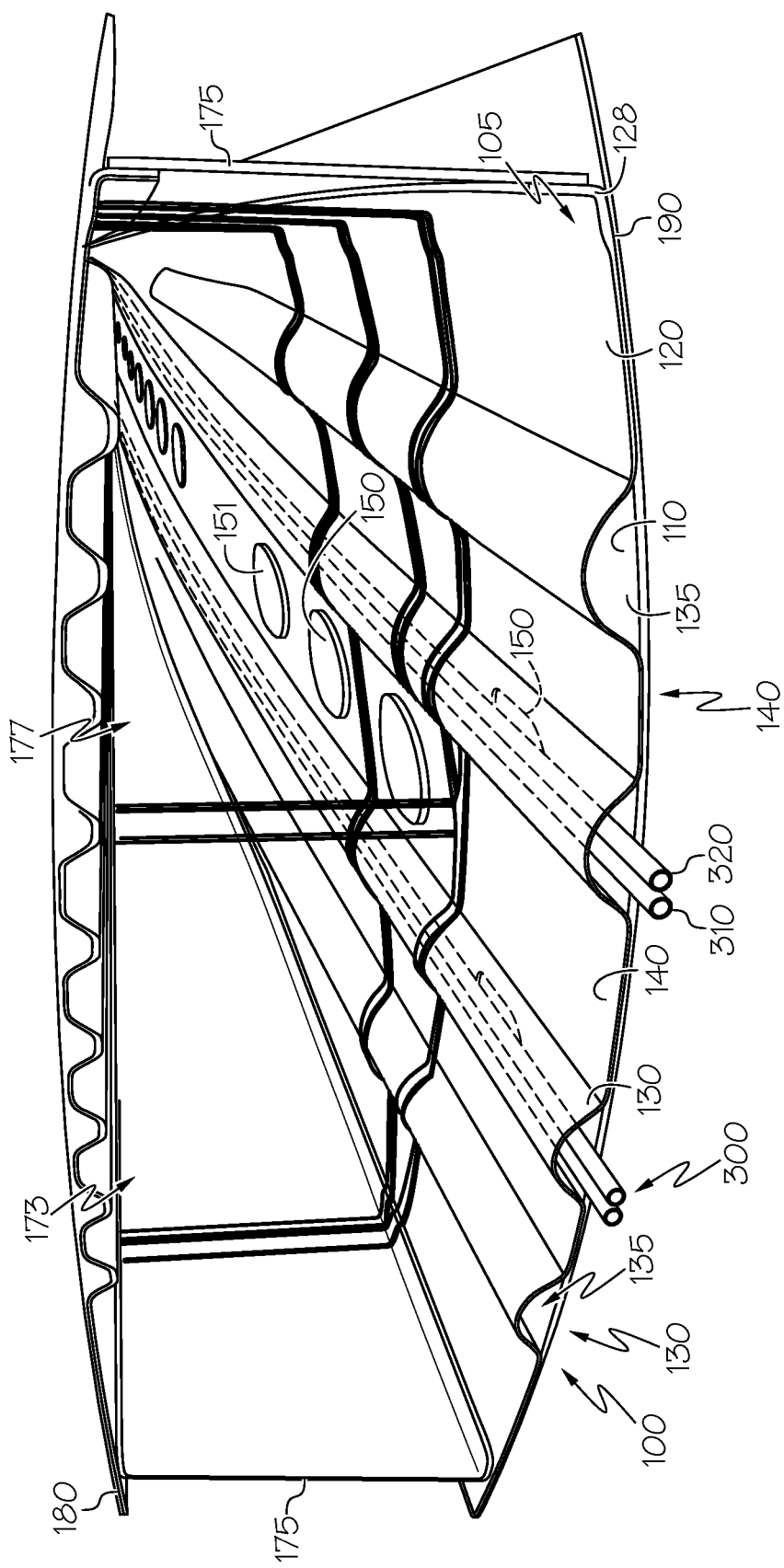
FIG. 1 is a perspective view of a composite structure.

FIG. 1 illustrate a perspective view of a composite structure 100 that includes a first layer 110 and a second layer 120. The first layer 110 is connected to the second layer 120 to form a layered structure 105. While the composite structure 100 is shown in FIG. 1 as a skin panel of an aircraft wing, those skilled in the art will appreciate that the disclosed composite structures 100 may be used in various applications, including various non-aerospace applications.

In one or more examples, the second layer 120 of the composite structure 100 includes a plurality of base portions 140 and a plurality of beaded portions 130. The plurality of base portions 140 may abut the first layer 110 within the layered structure 105 of the composite structure 100. The plurality of beaded portions 130 may protrude from the plurality of base portions 140. Therefore, each beaded portion 130 of the plurality of beaded portions 130 defines an associated channel 135 between the first layer 110 and the second layer 120 such that the composite structure 100 includes a plurality of channels 135.

In one or more examples, at least one system feature 300 may be disposed in at least one channel 135 of the plurality of channels 135. The system feature 300 may be, for example, a wire 310, a conduit 320, a cable, a tube, optical fiber, or the like. Various other system features 300 may be received within the plurality of channels 135 without departing from the scope of the present disclosure.

In one or more examples, the second layer 120 of the composite structure 100 may be formed from or may include a composite material. The composite material of the second layer 120 may include a reinforcement material encapsulated in a polymeric matrix material. As a specific, non-limiting example, the reinforcement material may be (or may include) carbon fibers, glass fibers or the like, while the polymeric matrix material may be (or may include) thermoset (e.g., epoxy) resin. The use of various thermoplastic resins, such as a polyaryletherketone, is also contemplated.

In one or more examples, the layered structure 105 of the composite structure 100 defines one or more access openings 150. In one variation, the access opening 150 extends through both the first layer 110 and the second layer 120. In another variation, the access opening 150 extends through only the first layer 110 of the layered structure 105. In yet another variation, the access opening 150 extends through only the second layer 120 of the layered structure 105. Therefore, an access opening 150 may be located in a beaded portion 130 of the plurality of beaded portions 130 (FIG. 6), on a base portion 140 of the plurality of base portions 140, or the composite structure 100 includes more than one access opening 150 wherein at least one access opening 150 is located in a beaded portion 130 and at least one access opening 150 is located on a base portion 140.

Figure 6:
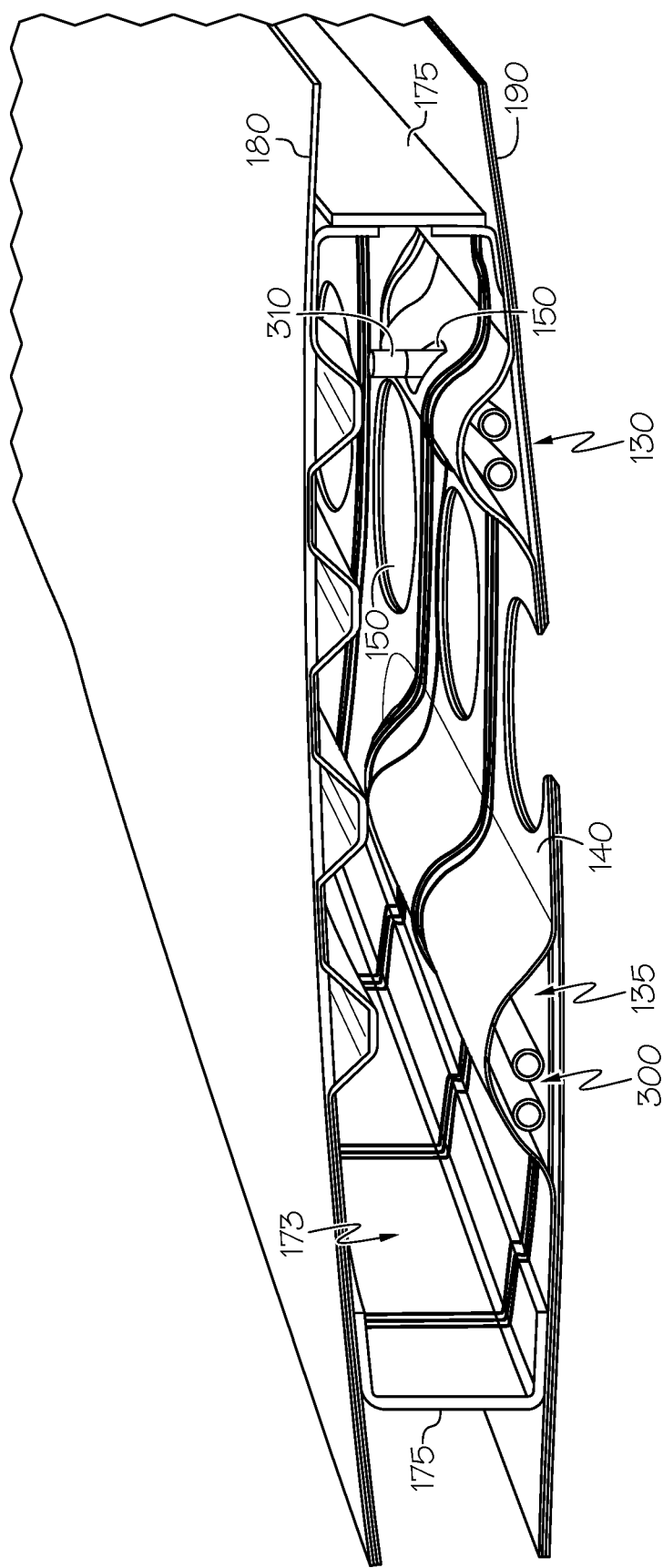
FIG. 6 is a perspective view of a composite structure.

The at least one access opening 150, illustrated in FIG. 6, allows for access to a beaded portion 130 of the plurality of beaded portions 130 for maintenance. One or more system features 300 may be located in a beaded portion 130 of the plurality of beaded portions 130. The access opening 150 allows for the one or more system features 300 to pass outside of the beaded portion 130.

As shown in FIG. 1, in one or more examples, the composite structure 100 may further include an access panel 151 (FIG. 1) sealing at least one access opening 150. The access panel 151 can be fluid-tight such that is keeps fluid from passing through the associated access opening 150. The access panel 151 (fuel dam) is configured to be easily accessible for inspection and repair from outside an aircraft wing 170, thus reducing the need to enter a confined space.

In one or more examples, the first layer 110 of the composite structure 100 is substantially free of beaded portions 130. Alternatively, while not shown in the drawings, the first layer 110 may include a plurality of beaded portions 130 and a plurality of base portions 140, similar to the second layer 120.

In one or more examples, the first layer 110 of the composite structure 100 may be formed from or may include a composite material. The composite material of the first layer 110 may include a reinforcement material encapsulated in a polymeric matrix material. As a specific, non-limiting example, the reinforcement material may be (or may include) carbon fibers, glass fibers or the like, while the polymeric matrix material may be (or may include) thermoset (e.g., epoxy) resin. The use of various thermoplastic resins, such as a polyaryletherketone, is also contemplated.

Figure 2A:
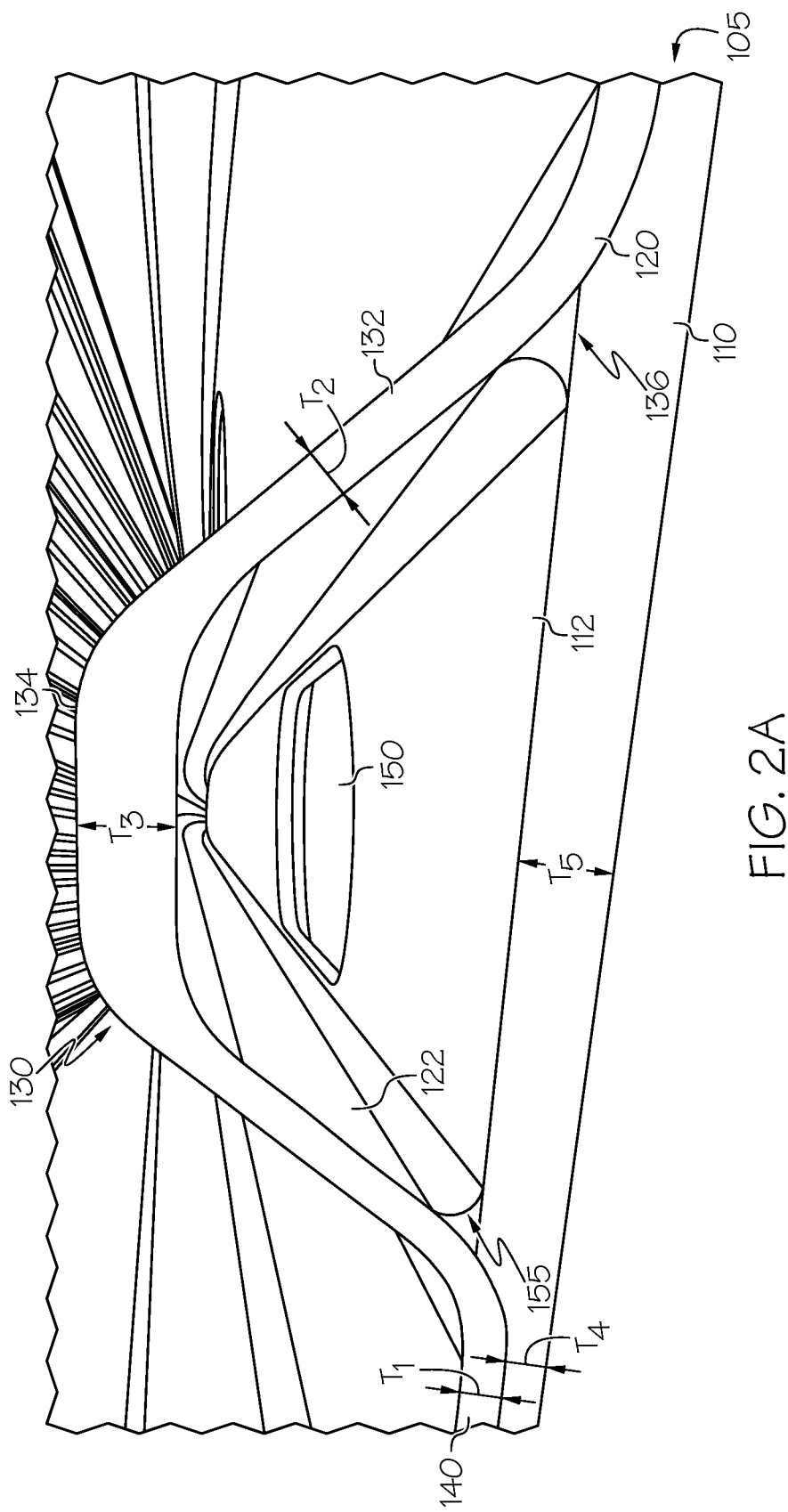
FIG. 2A is a perspective view of a beaded portion of a composite structure.
Figure 2B:
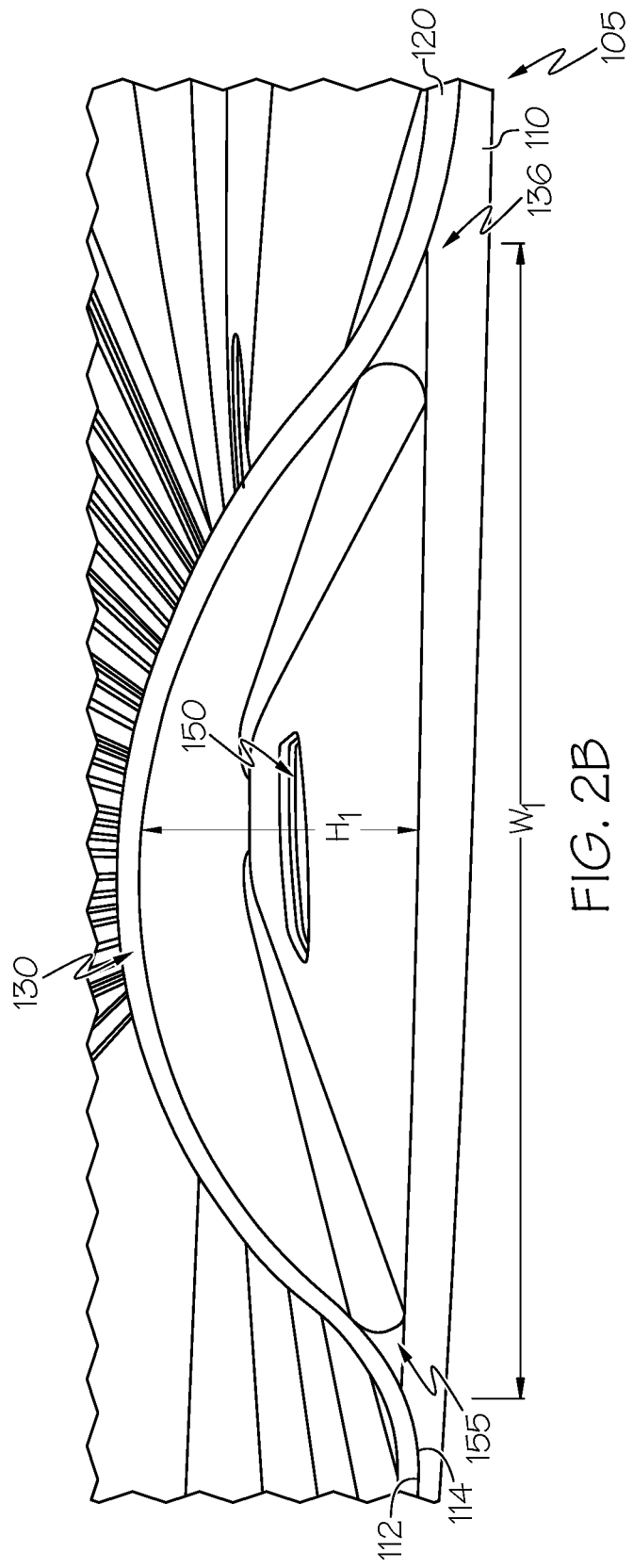
FIG. 2B is a perspective view of a beaded portion of the composite structure of FIG. 1.

As best shown in FIGS. 2A and 2B, in one or more examples, the first layer 110 may define an access opening 150 providing access to the channel 135 (FIG. 1) between the first layer 110 and the second layer 120. Those skilled in the art will appreciate that the composite structure 100 may include more than one access opening 150 providing access to the plurality of channels 135 (FIG. 1).

FIG. 2A and FIG. 2B illustrate two examples of the beaded portions 130 of the plurality of beaded portions 130. Specifically, FIG. 2A illustrates a beaded portion 130 that is generally hat-shaped in cross-section, while FIG. 2B illustrates a beaded portion 130 having a generally rounded shape in cross-section.

As shown in FIG. 2A, each beaded portion 130 of the plurality of beaded portions 130 may include opposed sidewall portions 132 and a cap portion 134 extending between the sidewall portions 132. In one or more examples, the plurality of base portions 140 have a nominal first cross-sectional thickness $T_1$, the sidewall portions 132 have a nominal second cross-sectional thickness $T_2$, the cap portion 134 has a nominal third cross-sectional thickness $T_3$. In one or more examples, the nominal third cross-sectional thickness $T_3$ is substantially greater (e.g., at least 5 percent greater, such as at least 20 percent greater) than the nominal first cross-sectional thickness $T_1$ and substantially greater (e.g., at least 5 percent greater, such as at least 20 percent greater) than the nominal second cross-sectional thickness $T_2$. In one or more examples, the nominal first cross-sectional thickness $T_1$ is substantially the same as the nominal second cross-sectional thickness $T_2$. In one or more examples, the nominal first cross-sectional thickness $T_1$, the nominal second cross-sectional thickness $T_2$, and the nominal third cross-sectional thickness $T_3$ are substantially the same.

As illustrated in FIG. 2A, the first layer 110 has a nominal fourth cross-sectional thickness $T_4$ proximate each base portion 140 of the plurality of base portions 140 of the second layer 120. The first layer 110 further has a nominal fifth cross-sectional thickness $T_5$ below each beaded portion 130 of the plurality of beaded portions 130. In one or more examples, the nominal fifth cross-sectional thickness $T_5$ is substantially the same as a sum of the first cross-sectional thickness $T_1$ and the nominal fourth cross-sectional thickness $T_4$. The nominal fifth cross-sectional thickness $T_5$ is greater than the nominal fourth cross-sectional thickness $T_4$ such that the second layer 120 is configured to self-nest with the first layer 110. In one or more examples, the nominal fifth cross-sectional thickness $T_5$ is substantially the same as the nominal third cross-sectional thickness $T_3$.

Referring to FIG. 2B, when one or more beaded portions 130 of the plurality of beaded portions 130 has a rounded shape in cross-section, the rounded beaded portion 130 may have a nominal width $W_1$ and a nominal height $H_1$. In one or more examples, a ratio of the nominal height $H_1$ to the nominal width $W_1$ may be less than 1. In other examples, a ratio of the nominal height $H_1$ to the nominal width $W_1$ is approximately 1. In yet other examples, as illustrated in FIG. 2B, each beaded portion 130 of the plurality of beaded portions 130 is elongated such that it has a generally oval shape.

Figure 3A:
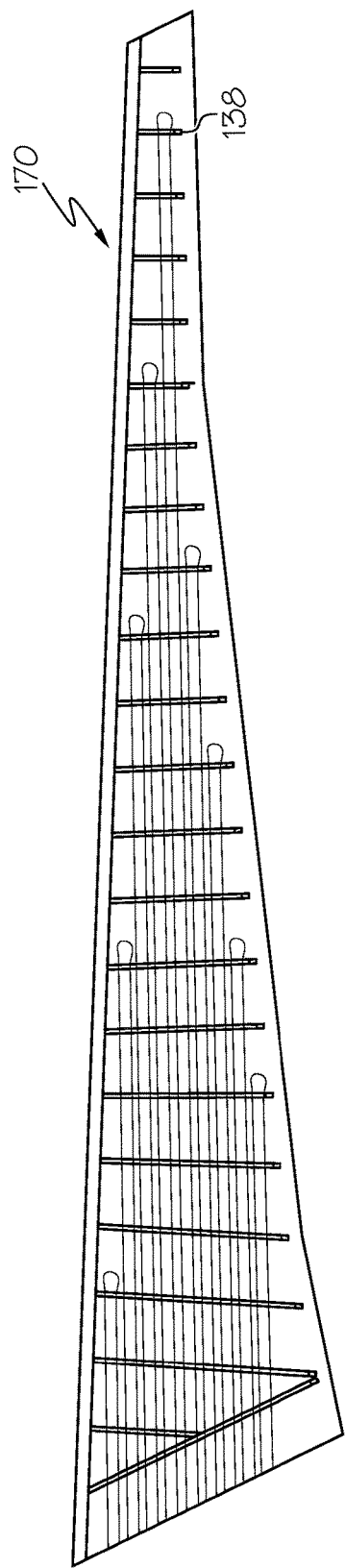
FIG. 3A is a top plan view of a wing of an airplane.
Figure 3B:
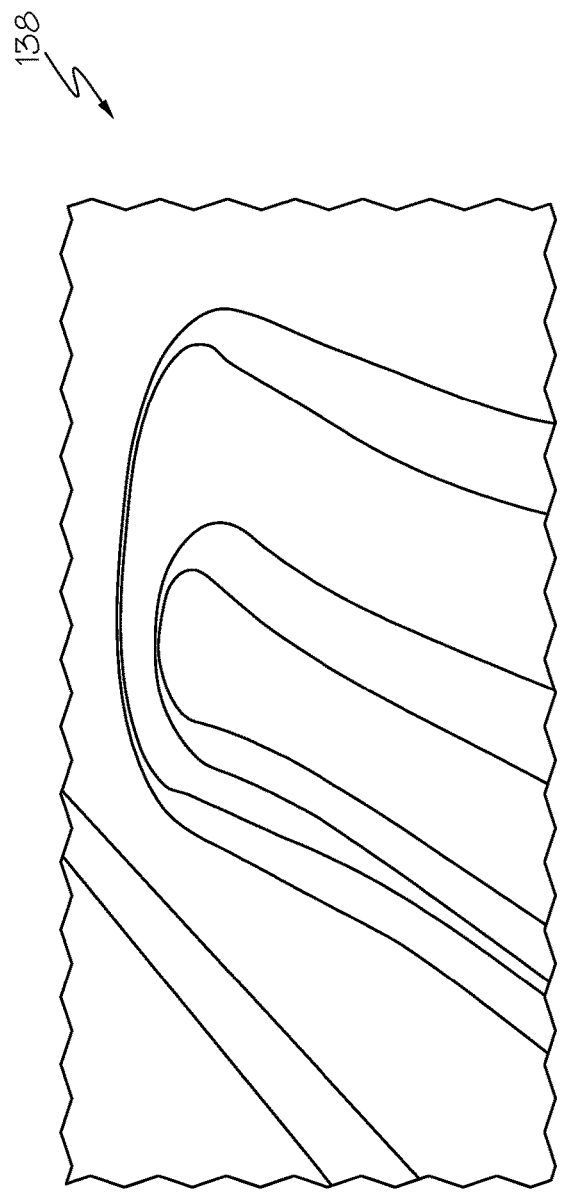
FIG. 3B is a perspective view of a beaded portion of the wing of FIG. 3A.

In one or more examples, as illustrated in FIG. 3B, each beaded portion 130 of the plurality of beaded portions 130 includes a tapered end cap 138 that transitions to a base portion 140 of the plurality of base portions 140. The tapered end cap 138 has a flared geometry to transition from a hat shape or round shape beaded portion 130 to a generally planar portion of the second layer 120. In one or more examples, the tapered end cap 138 is integrated with the second layer 120 such that they are a single monolithic body. In one or more examples, the tapered end cap 138 is formed separately, such as punch formed, and then co-cured with the second layer 120 for integration.

As illustrated in FIGS. 2A and 2B, the layered structure 105 defines a transition region 136 where the second layer 120 transitions from a base portion 140 of the plurality of base portions 140 to a beaded portion 130 of the plurality of beaded portions 130. In one or more examples, a filler material 155 is disposed in the transition region 136 between the first layer 110 and the second layer 120. The filler material 155 defines a fillet region within the transition region 136. In one or more examples, the filler material 155 is co-cured with at least one of the first layer 110 or the second layer 120 of the layered structure 105.

Figure 4:
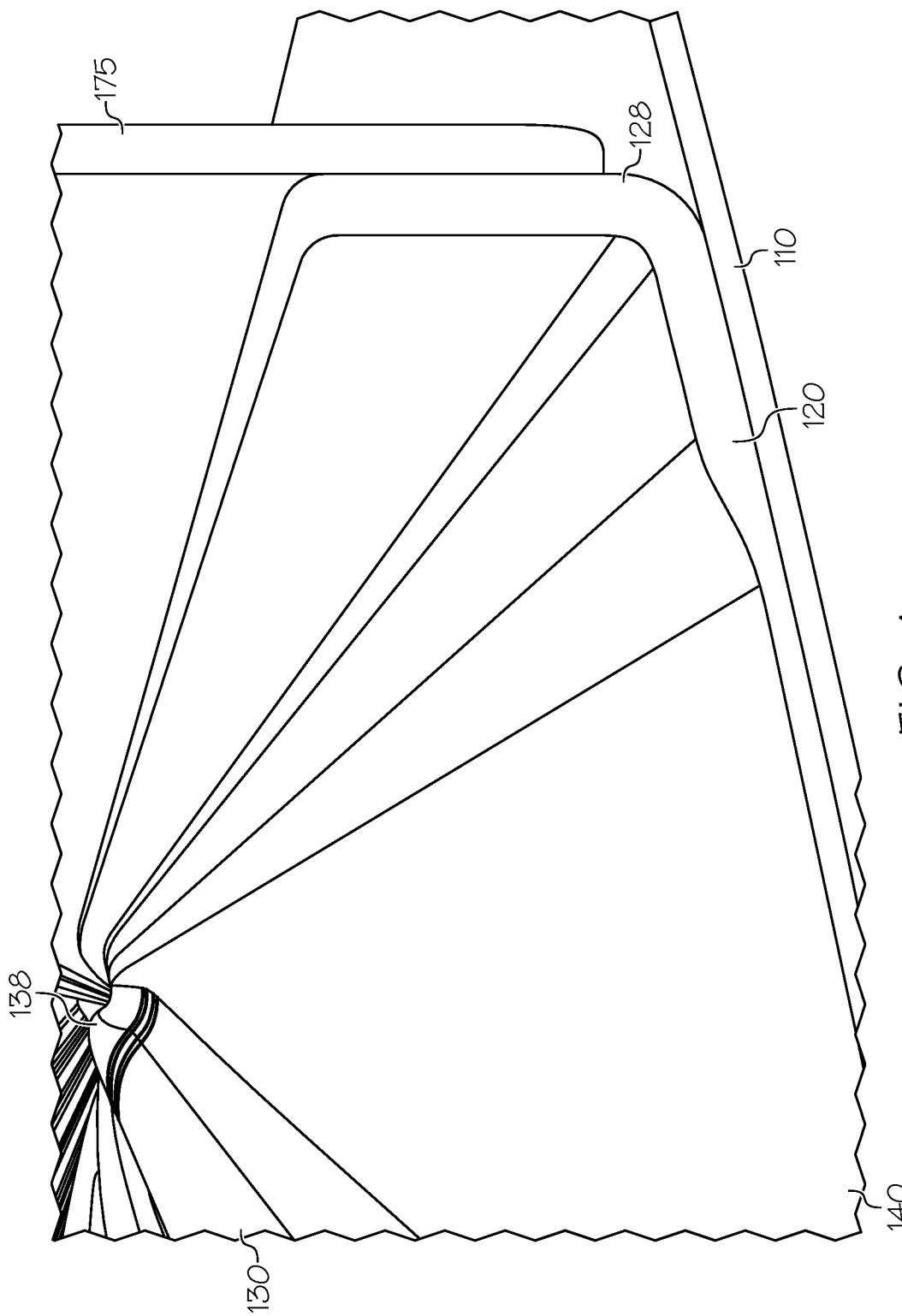
FIG. 4 is a perspective view of a portion of the composite structure of FIG. 1.

FIG. 4 illustrates a portion of an exemplary embodiment of the second layer 120. In one or more examples, the second layer 120 includes at least one integral flange 128. The integral flange 128 is configured to align with a spar 175. In one or more examples, the integral flange 128 is substantially parallel with a spar 175.

In one or more examples, the first layer 110 and the second layer 120 of the disclosed composite structure 100 may be co-cured, thereby yielding the layered structure 105 of the composite structure 100. Alternatively, the layered structure 105 of the disclosed composite structure 100 may include an adhesive (not shown) disposed between the first layer 110 and the second layer 120. The adhesive may be positioned between a first major surface 112 (FIG. 2B) of the first layer 110 and a second major surface 122 (FIG. 2B) of the second layer 120 along the base portions 140 of the second layer 120.

As illustrated in FIG. 3A, disclosed is an aircraft wing 170. The aircraft wing 170 may be generally tapered in shape. In one or more examples, the aircraft wing 170 includes a lower skin panel 190 and an upper skin panel 180. At least one of the upper skin panel 180 and the lower skin panel 190 includes the disclosed composite structure 100 comprised of a first layer 110 and a second layer 120. The second layer 120 is connected to the first layer 110 to form a layered structure 105. In one or more examples, the second layer 120 includes a plurality of base portions 140 abutting the first layer 110. The second layer 120 further includes a plurality of beaded portions 130 protruding from the plurality of base portions 140. In one or more examples, each beaded portion 130 of the plurality of beaded portions 130 defines a channel 135 between the first layer 110 and the second layer 120. The plurality of beaded portions 130 may include approximately eight beaded portions 130. In one or more examples, at least one system feature 300 is disposed in the plurality of channels 135. The system feature 300 is one of a wire 310, a conduit 320, or any other system feature 300 provided therein.

In one or more examples, as illustrated in FIG. 1, both the upper skin panel 180 and the lower skin panel 190 have a layered structure 105 including a first layer 110 and a second layer 120. The second layer 120 is connected to the first layer 110 to form the layered structure 105. In one or more examples, the second layer 120 includes a plurality of base portions 140 abutting the first layer 110. The second layer 120 further includes a plurality of beaded portions 130 protruding from the plurality of base portions 140. In one or more examples, each beaded portion 130 of the plurality of beaded portions 130 defines a channel 135 between the first layer 110 and the second layer 120. The plurality of beaded portions 130 may include approximately 8 of each beaded portion 130. In one or more examples, at least one system feature 300 is disposed in the plurality of channels 135. The system feature 300 is one of a wire 310, a conduit 320, or any other system feature 300 provided therein.

In one or more examples, the aircraft wing 170 includes a fluid-tight volume 177 defined, at least partially, by the upper skin panel 180, the lower skin panel 190, and the spar 175. The plurality of channels 135 are fluidly isolated from the fluid-tight volume 177 such that no liquid contaminates any system feature 300 disposed within a channel 135 of the plurality of channels 135. In one or more examples, the aircraft wing 170 includes at least one rib 173 disposed between the upper skin panel 180 and the lower skin panel 190. The at least one rib 173 defines a fluid-tight volume 177 with the upper skin panel 180, the lower skin panel 190, and the spar 175. In one or more examples, the aircraft wing 170 includes more than one rib 173 that define more than one fluid-tight volume 177. In one or more examples, at least one fluid-tight volume 177 is a fuel tank.

Figure 5A:
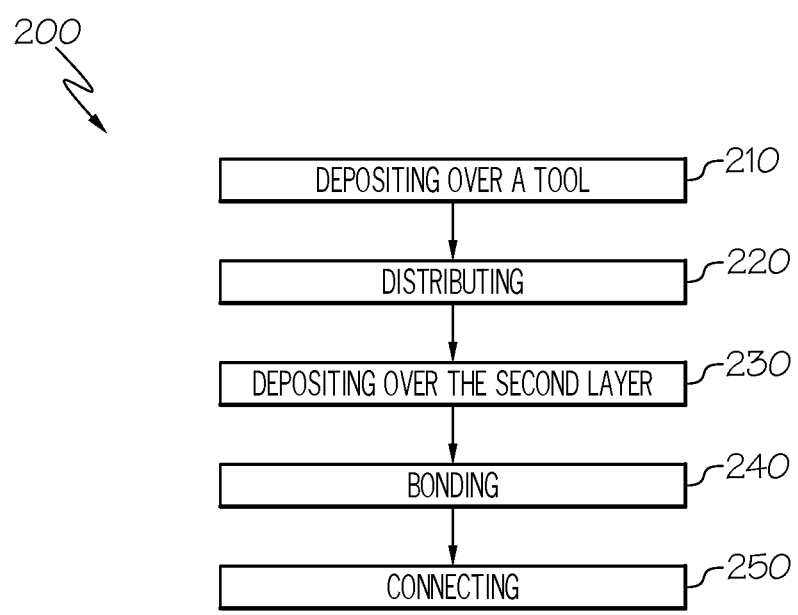
FIG. 5A is a flowchart of a method for manufacturing the composite structure of FIG. 1.

FIG. 5A illustrates a flow diagram of a method 200 for manufacturing a composite structure 100. The method 200 includes depositing 210 composite material over a tool to form a second layer 120. The second layer 120 includes a plurality of beaded portions 130 and a plurality of base portions 140. In one or more examples, the plurality of beaded portions 130 define a plurality of channels 135.

In one or more examples, the method 200 includes distributing 220 a plurality of mandrels over the second layer 120 to define channels in the plurality of beaded portions 130. In one or more examples, the distributing 220 the plurality of mandrels includes distributing 220 a plurality of dissolvable mandrels. In one or more examples, the plurality of dissolvable mandrels include a ceramic material. The ceramic material is dissolvable in water. In one or more examples, the plurality of beaded portions 130 define a plurality of channels 135.

In one or more examples, the method 200 includes depositing 230 composite material over the second layer 120 and the plurality of mandrels to form a first layer 110. The first layer 110 is substantially free of beaded portions 130.

In one or more examples, the method 200 includes bonding 240 the first layer 110 to the second layer 120. The bonding 240 is achieved by curing 253 one or more of the first layer 110 and the second layer 120 simultaneously or sequentially. Curing 253 may be performed in an autoclave. In one or more examples, the bonding 240 includes curing 253 the first layer 110. In one or more examples, the bonding 240 includes curing 253 an adhesive disposed between the first layer 110 and the second layer 120. In one or more examples, the bonding 240 includes curing 253 the second layer 120.

In one or more examples, the method 200 for manufacturing a composite structure 100 includes connecting 250 a first layer 110 to a second layer 120 to form a layered structure 105. The second layer 120 of the layered structure 105 includes a plurality of base portions 140 abutting the first layer 110 and a plurality of beaded portions 130 protruding from the plurality of base portions 140. In one or more examples, each beaded portion 130 of the plurality of beaded portions 130 defines a channel 135 between the first layer 110 and the second layer 120.

In one or more examples, the connecting 250 includes co-curing 259 the first layer 110 and the second layer 120 to form a layered structure 105.

Figure 5B:
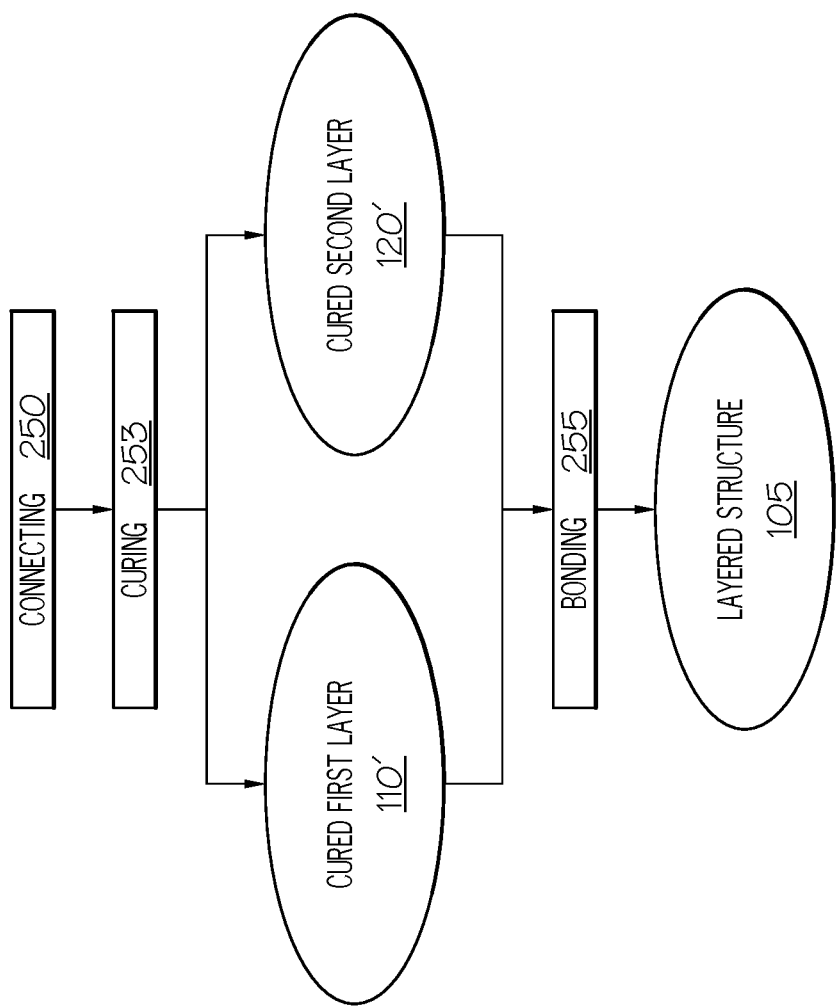
FIG. 5B is a flowchart of a portion of the method of FIG. 5A.

FIG. 5B illustrates one exemplary embodiment of the connecting 250. In one or more examples, the connecting 250 includes separately curing 253 the first layer 110 and the second layer 120 to yield a cured first layer 110' and a cured second layer 120'. The connecting 250 further includes bonding 255 the cured first layer 110' to the cured second layer 120' to form a layered structure 105.

Figure 5C:
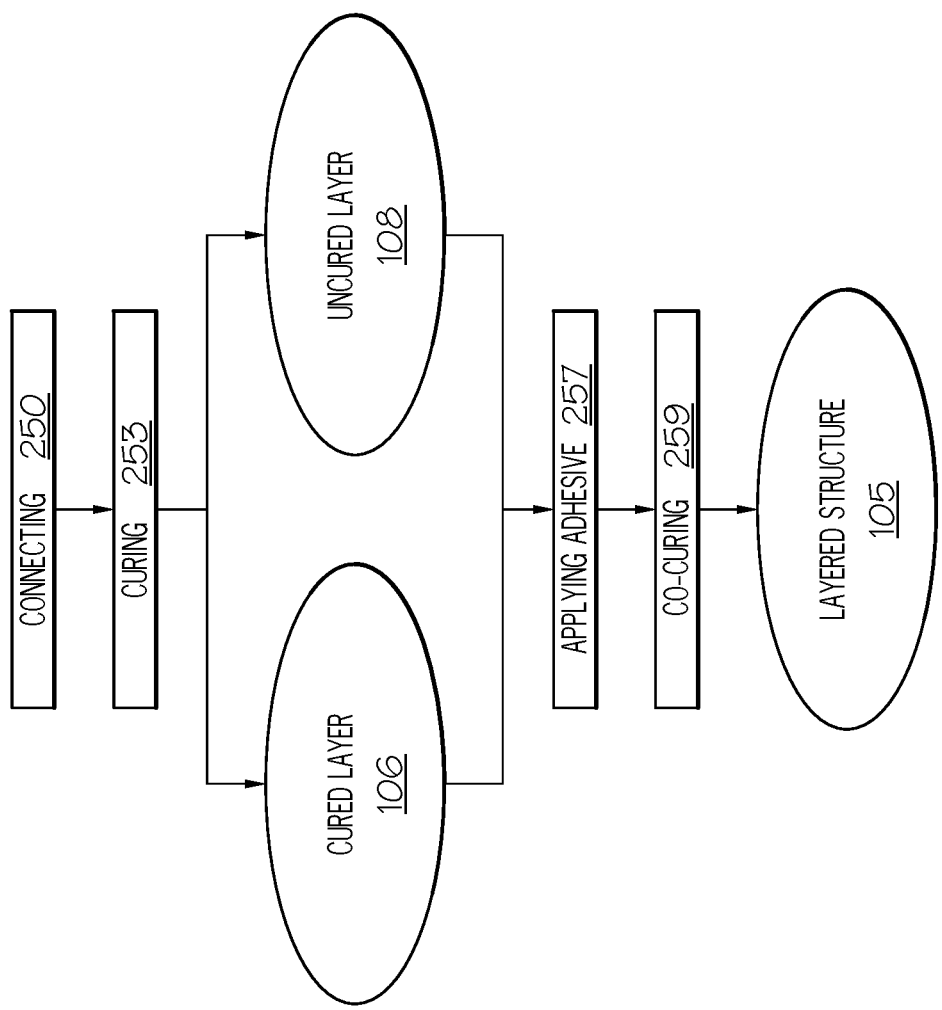
FIG. 5C is a flowchart of a portion of the method of FIG. 5A.

FIG. 5C illustrates another exemplary embodiment of the connecting 250. In one or more examples, the connecting 250 includes curing one of the first layer 110 and the second layer 120 to yield a cured layer 106 and an uncured layer 108. The connecting 250 further includes applying 257 an adhesive between the cured layer 106 and the uncured layer 108. The connecting 250 further includes co-curing 259 the adhesive and the uncured layer 108 to form a layered structure 105.

Figure 7:
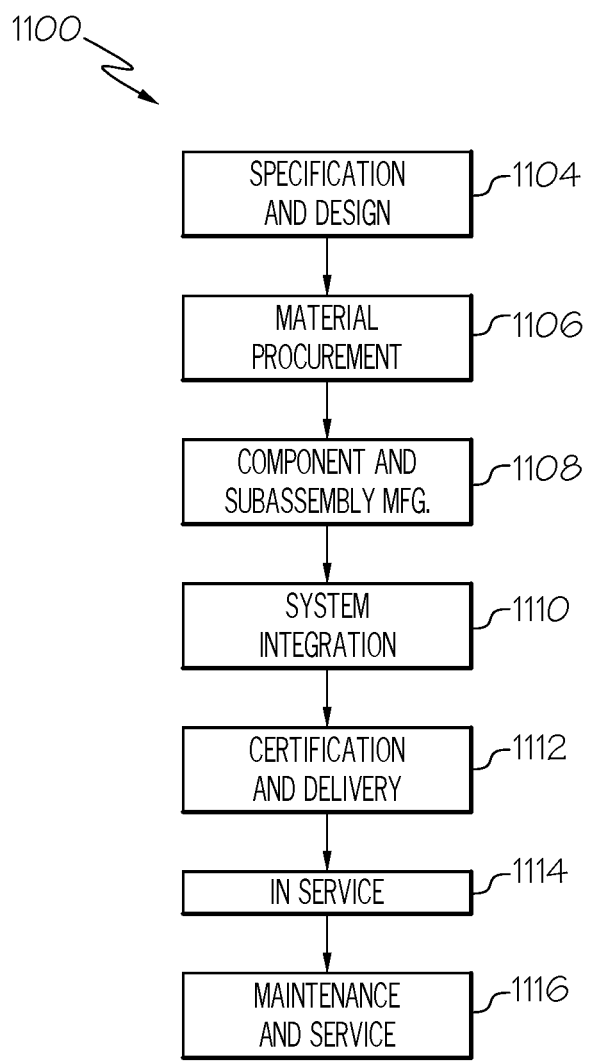
FIG. 7 is a block diagram of aircraft production and service methodology.
Figure 8:
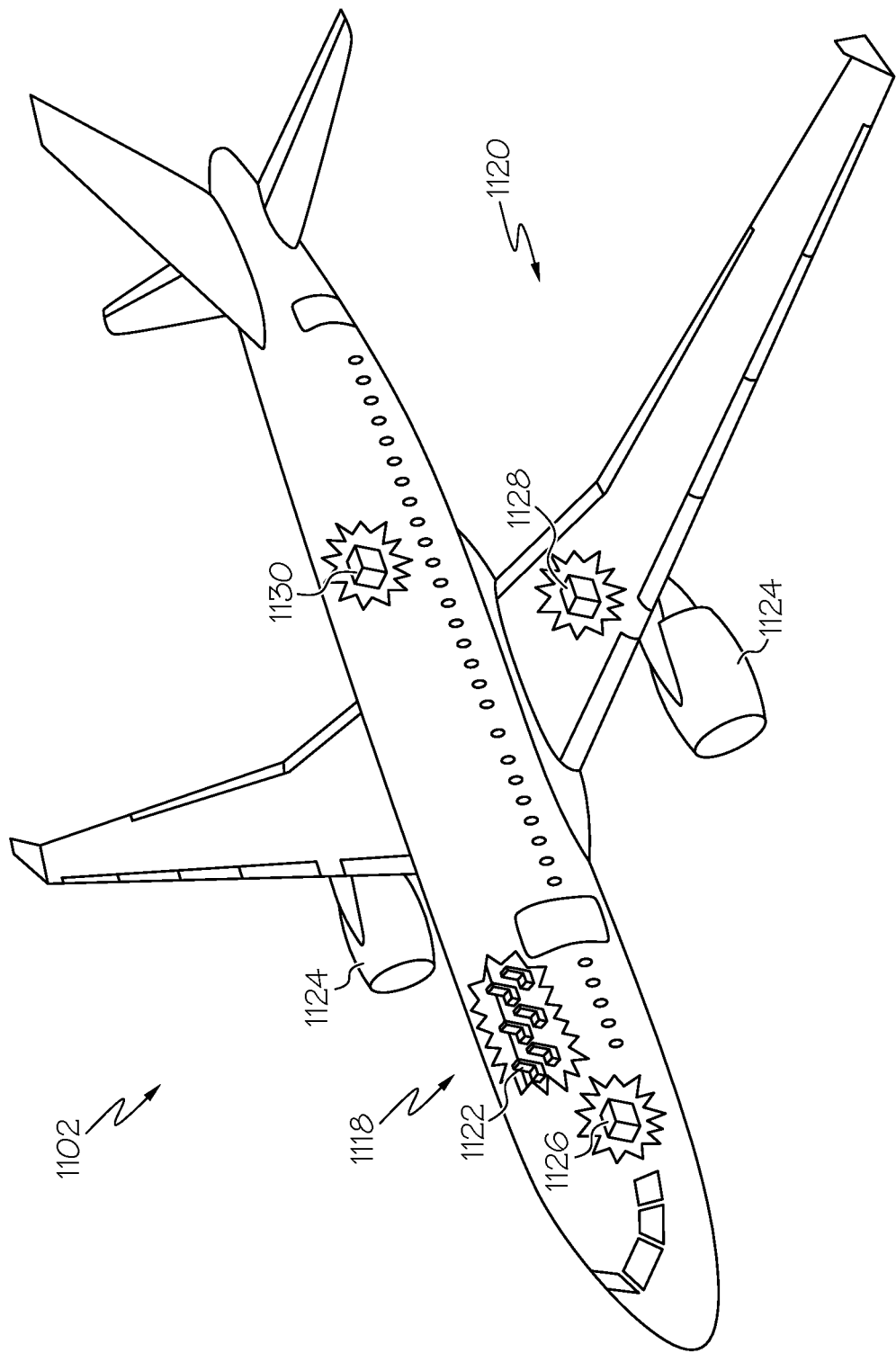
FIG. 8 is a schematic illustration of an aircraft.

Examples of the subject matter disclosed herein may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Although various examples of the disclosed beaded composite structures and methods for manufacturing beaded composite structures have been shown and described, modifications may occur to those skilled in the art upon reading the specification. The present application includes such modifications and is limited only by the scope of the claims.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A composite structure comprising:
    a first layer; and
    a second layer connected to the first layer to form a layered structure, the second layer comprising:
        a plurality of base portions abutting the first layer; and
        a plurality of beaded portions protruding from the plurality of base portions, each beaded portion of the plurality of beaded portions defining a channel between the first layer and the second layer, at least one channel configured to have a system feature disposed between the first layer and the second layer;
        at least one first access opening formed through the first layer into the at least one channel to provide access to the at least one channel and the system feature from outside the first layer of the layered structure; and
        at least one second access opening formed through at least one beaded portion of the second layer into the at least one channel to provide ingress and egress for the system feature from outside the second layer of the composite structure; and
    at least one third access opening formed through the first layer and at least one base portion of the second layer between an adjacent pair of beaded portions.

2. The composite structure of claim 1 wherein the first layer is substantially free of beaded portions.

3. The composite structure of claim 1 wherein the plurality of base portions and the plurality of beaded portions of the second layer comprise a single monolithic body.

4. The composite structure of claim 1 further comprising an adhesive disposed between the first layer and the second layer.

5. The composite structure of claim 4 wherein the adhesive is disposed between a first major surface of the first layer and a second major surface of the second layer along the base portions of the second layer.

6. The composite structure of claim 1 wherein each beaded portion of the plurality of beaded portions comprises opposed sidewall portions and a cap portion between the opposed sidewall portions.

7. The composite structure of claim 6 wherein:
the plurality of base portions have a first cross-sectional thickness,
the opposed sidewall portions have a second cross-sectional thickness,
the cap portion has a third cross-sectional thickness, and
the third cross-sectional thickness is substantially greater than the first cross-sectional thickness and substantially greater than the second cross-sectional thickness.

8. The composite structure of claim 6 wherein:
the plurality of base portions have a first cross-sectional thickness,
the opposed sidewall portions have a second cross-sectional thickness,
the cap portion has a third cross-sectional thickness, and
the first cross-sectional thickness, the second cross-sectional thickness, and the third cross-sectional thickness are substantially the same.

9. The composite structure of claim 6 wherein:
the plurality of base portions have a first cross-sectional thickness,
the first layer has a fourth cross-sectional thickness at each base portion of the plurality of base portions,
the first layer has a fifth cross-sectional thickness at each beaded portion of the plurality of beaded portions, and
the fifth cross-sectional thickness is substantially the same as a sum of the first cross-sectional thickness and the fourth cross-sectional thickness.

10. The composite structure of claim 1 wherein the layered structure defines a transition region where the second layer transitions from a base portion of the plurality of base portions to a beaded portion of the plurality of beaded portions, and wherein a filler material is disposed in the transition region between the first layer and the second layer.

11. The composite structure of claim 1 further comprising at least one access panel that seals the at least one third access opening.

12. The composite structure of claim 1 wherein:
each beaded portion of the plurality of beaded portions has a width,
each beaded portion of the plurality of beaded portions has a height, and
a ratio of ($H_1$) to ($W_1$) is less than 1.

13. The composite structure of claim 1 wherein each beaded portion of the plurality of beaded portions is elongated.

14. The composite structure of claim 13 wherein each beaded portion of the plurality of beaded portions comprises a tapered end cap that transitions to a base portion of the plurality of base portions.

15. The composite structure of claim 1 wherein the system feature comprises at least one of a wire, a conduit, a cable, a tube and an optical fiber.

16. The composite structure of claim 11 wherein the at least one access panel provides a fluid-tight seal over the at least one third access opening.

17. The composite structure of claim 10 wherein each beaded portion of the plurality of beaded portions comprises opposed sidewall portions and a cap portion between the opposed sidewall portions.

18. The composite structure of claim 17 further comprising an adhesive disposed between the first layer and the second layer.

19. The composite structure of claim 17 wherein each beaded portion of the plurality of beaded portions comprises a tapered end cap that transitions to a base portion of the plurality of base portions.

20. An aircraft wing comprising:
an upper skin panel; and
a lower skin panel, wherein at least one of the upper skin panel and the lower skin panel comprises:
a first layer; and
a second layer connected to the first layer to form a layered structure, the second layer comprising:
a plurality of base portions abutting the first layer; and
a plurality of beaded portions protruding from the plurality of base portions, each beaded portion of the plurality of beaded portions defining an associated channel of a plurality of channels between the first layer and the second layer, at least one channel of the plurality of channels configured to have a system feature disposed between the first layer and the second layer;
at least one first access opening formed through the first layer into the at least one channel to provide access to the at least one channel and the system feature from outside the first layer of the layered structure; and
at least one second access opening formed through at least one beaded portion of the second layer into the at least one channel to provide ingress and egress for the system feature from outside the second layer of the composite structure; and
at least one third access opening formed through the first layer and at least one base portion of the second layer between an adjacent pair of beaded portions,
wherein the system feature comprises at least one of a wire, a conduit, a cable, a tube and an optical fiber.

* * * * *